United States Patent
Wang

(10) Patent No.: US 12,551,244 B2
(45) Date of Patent: Feb. 17, 2026

(54) PEDICLE SCREW SWITCHABLE BETWEEN MONOAXIAL MODE AND POLYAXIAL MODE

(71) Applicant: Shih-Tien Wang, Taipei (TW)

(72) Inventor: Shih-Tien Wang, Taipei (TW)

(*) Notice: Subject to any disclaimer, the term of this patent is extended or adjusted under 35 U.S.C. 154(b) by 195 days.

(21) Appl. No.: 18/519,186

(22) Filed: Nov. 27, 2023

(65) Prior Publication Data

US 2024/0188994 A1 Jun. 13, 2024

(30) Foreign Application Priority Data

Dec. 8, 2022 (TW) .................................. 111147128

(51) Int. Cl.
*A61B 17/70* (2006.01)

(52) U.S. Cl.
CPC ...... *A61B 17/7037* (2013.01); *A61B 17/7032* (2013.01)

(58) Field of Classification Search
CPC .......... A61B 2090/037; A61B 17/7032; A61B 17/7037; A61B 17/7038
See application file for complete search history.

(56) References Cited

U.S. PATENT DOCUMENTS

| | | | |
|---|---|---|---|
| 6,565,567 B1 * | 5/2003 | Haider | A61B 17/7037 606/268 |
| 7,942,911 B2 * | 5/2011 | Doubler | A61B 17/7037 606/267 |
| 8,906,068 B1 * | 12/2014 | Bedor | A61B 17/7037 606/267 |
| 10,064,658 B2 * | 9/2018 | Jackson | A61B 17/7037 |
| 10,349,982 B2 | 7/2019 | Culbert | |
| 11,471,195 B2 * | 10/2022 | Jackson | A61B 17/7005 |
| 12,251,138 B2 * | 3/2025 | Jackson | A61B 17/7037 |

(Continued)

FOREIGN PATENT DOCUMENTS

| | | |
|---|---|---|
| CN | 204765857 U | 11/2015 |
| CN | 207253371 U | 4/2018 |

(Continued)

OTHER PUBLICATIONS

TW Office Action dated Oct. 18, 2023 in Taiwan application No. 111147128.

*Primary Examiner* — Eduardo C Robert
*Assistant Examiner* — Holly Joanna Lane
(74) *Attorney, Agent, or Firm* — McClure, Qualey & Rodack, LLP

(57) ABSTRACT

A pedicle screw is switchable between a monoaxial mode and a polyaxial mode, which mainly comprises a tulip, a bone screw, and a fastener. The tulip includes an upper opening, a lower opening, and two side openings; the two side openings allow a corrective connecting rod to pass through; the fastener is tightly screwed to the upper opening of the tulip; the bone-locking section of the bone screw passes through the lower opening of the tulip. The tulip can be deflected in multiple axial directions relative to the bone screw; when the corrective connecting rod is locked by the fastener, and the second coupling portion of the bone screw is coupled to the first coupling portion of the tulip, the tulip is forcedly fastened to the bone screw and cannot be deflected, therefore make the pedicle screw switched from the polyaxial mode to the monoaxial mode.

12 Claims, 6 Drawing Sheets

(56) References Cited

U.S. PATENT DOCUMENTS

| | | | |
|---|---|---|---|
| 12,295,621 B2 * | 5/2025 | Daniels | A61B 17/7032 |
| 2013/0226239 A1 | 8/2013 | Altarac et al. | |
| 2024/0252212 A1 * | 8/2024 | Jackson | A61B 17/7038 |

FOREIGN PATENT DOCUMENTS

| | | |
|---|---|---|
| CN | 208822934 U | 5/2019 |
| TW | M411913 U | 9/2011 |
| TW | M641298 U | 5/2023 |

\* cited by examiner

PEDICLE SCREW SWITCHABLE BETWEEN MONOAXIAL MODE AND POLYAXIAL MODE

FIELD OF THE INVENTION

The present invention relates to a medical device used in pedicle screw fixation surgery, in particular, to a pedicle screw with both monoaxial and polyaxial structural designs, which can be switched to a fixation form of a monoaxial mode or a polyaxial mode according to needs to facilitate perfect pedicle screw fixation surgery.

DESCRIPTION OF THE PRIOR ART

As medical technology continues to progress, many surgical operations and corrective surgeries can be performed smoothly without large wounds. This phenomenon can be said to be the result of the popularization of minimally invasive surgery. In terms of spinal fixation-related surgeries, the most common treated disease is degeneration of joint disease (such as slipping or loosening). For better treatment, pedicle screw fixation surgery is developed.

During the pedicle screw fixation surgery, the operation process of pedicle screws can be summarized as follows: first, a plurality of screws are screwed into pedicles at pre-positioned locking points; then, a connecting rod passes through the screws; finally, the screws are tightened to lock the connecting rod between the screws. Before locking the connecting rod, the curvature or bending angle of the connecting rod can be adjusted to properly stabilize the slipped or loosened spine for medical and correction purposes.

With regard to the evolution of the pedicle screw fixation surgery, you can see its outline by looking at the screws used in different periods of surgery. The screws used early in the pedicle screw fixation surgery are in a monoaxial mode. The advantage of this mode is that it has a simple structure, and the axial plane serving as a locking plane is more stable and can achieve vertebral body derotation. However, due to the irregular spinal structure of the pedicles, if vertebras are severely slipped or significantly deformed, the connecting rod cannot be locked directly with the screws and must be adjusted first.

Accordingly, a new generation of pedicle screws has been developed and is characterized in that the screw head that fixes the connecting rod can be deflected in multiple axial directions so it is called a polyaxial mode. The advantage of this mode is that during surgery, since the screw head can be deflected freely in multiple axial directions, it is easier for the connecting rod to assemble, making the locking more stable on the sagittal and coronal planes. When the connecting rod is locked with the screws, it can be fitted and adjusted according to the pedicle structure to avoid damage to the spine caused by stress concentration and deviation. However, the polyaxial screws sacrifice the stability of the locking on the axial plane so the correction effect on the axial plane is slightly inferior to that of the monoaxial screws.

To sum up, the polyaxial screws and the monoaxial screws each have their own advantages and disadvantages; however, the pedicle screw fixation surgery is actually a medical operation with considerable difficulty and risks and highly dependent on the surgeon's experiences and skills. If the above-mentioned monoaxial and polyaxial screws can complement each other to develop pedicle screws that are more flexible in adjustment during the locking process, the pedicle screw fixation surgery will be performed more smoothly. This is actually the motivation behind the inventor's efforts in developing a pedicle screw switchable between a monoaxial mode and a polyaxial mode.

SUMMARY OF THE INVENTION

The main objective of the present invention is to provide a pedicle screw switchable between a monoaxial mode and a polyaxial mode so that it can maintain considerable adjustment elasticity during pedicle screw fixation surgery and can be switched to the monoaxial mode or the polyaxial mode according to needs to achieve perfect pedicle screw fixation surgery.

In order to achieve the above objective, the present invention mainly provides a pedicle screw switchable between a monoaxial mode and a polyaxial mode, which mainly comprises a tulip, a bone screw, and a fastener. The tulip includes an upper opening, a lower opening, and two side openings; the upper opening communicates with the lower opening; the two side openings are arranged opposite to each other and communicate with the upper opening; the two side openings allow a corrective connecting rod to pass through; the lower opening includes a first coupling portion. The bone screw includes a head end and a bone-locking section; the head end is located in the tulip and includes a hemispherical top and a second coupling portion; the second coupling portion is located between the hemispherical top and the bone-locking section; the bone-locking section passes through the lower opening of the tulip. The fastener is screwed to the upper opening of the tulip. Accordingly, the tulip can be deflected in multiple axial directions relative to the bone screw, presenting the polyaxial mode; moreover, when the corrective connecting rod is locked by the fastener, and the second coupling portion of the bone screw is coupled to the first coupling portion of the tulip, the tulip is forcedly fastened to the bone screw and cannot be deflected, that is, at this time, the pedicle screw becomes a monoaxial pedicle screw.

In summary, the pedicle screw switchable between the monoaxial mode and the polyaxial mode provided by the present invention can not only adopt a polyaxial adjustment mode when the connecting rod is assembled to the tulip of the pedicle screw during a pre-locking stage, being more convenient and labor-saving in surgery but also make the locking on sagittal and coronal planes more stable, make it easier for the connecting rod to be locked with the screw, and avoid spinal damage caused by stress concentration and deviation.

On the other hand, when the connecting rod has been assembled and properly adjusted, that is, after the spine is stabilized, the fastener is further screwed to firmly lock the corrective connecting rod, and when the second coupling portion of the bone screw is coupled to the first coupling portion of the tulip, the pedicle screw is switched immediately to a monoaxial locking state to further improve the stability and correction effect of the locking on the axial plane.

It can be seen from the above that compared with the prior art, the present invention not only successfully combines the advantages of the polyaxial screw and the monoaxial screw, but also completely eliminates their shortcomings so it is actually unique and original technical thought and creation.

DETAILED DESCRIPTION OF THE INVENTION

Figure 1:
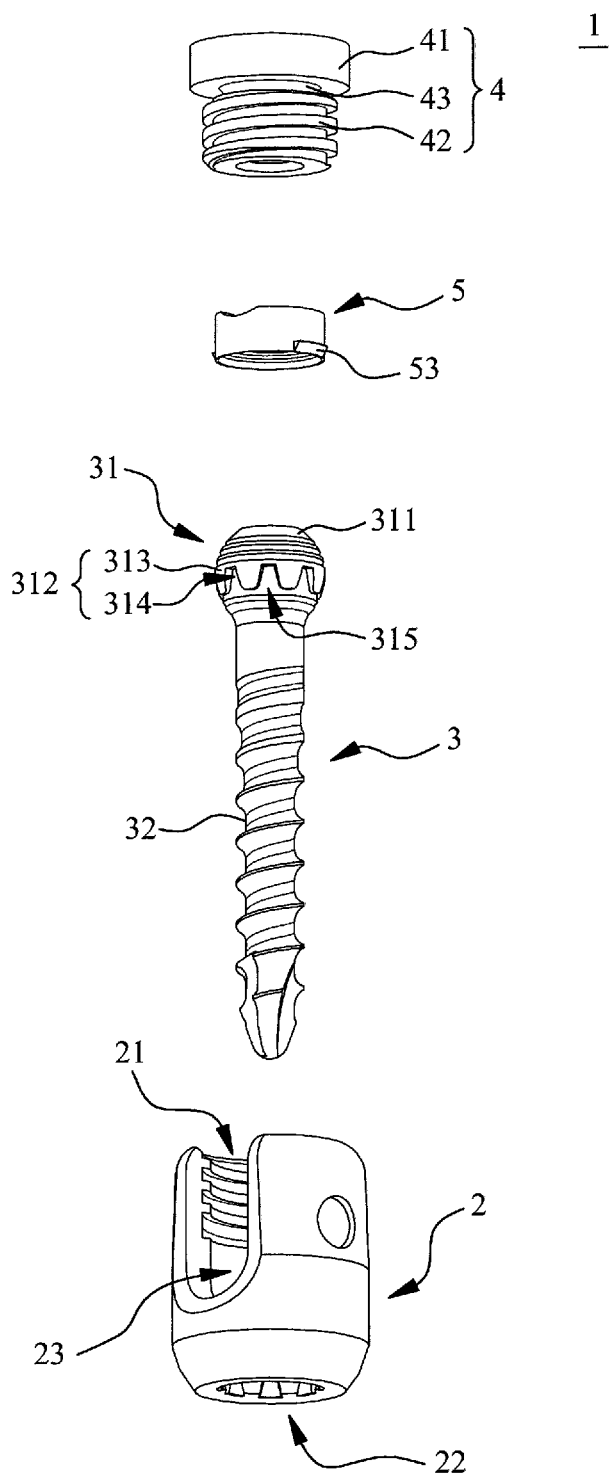
FIG. 1 is an exploded view showing a pedicle screw according to a first embodiment of the present invention.

Before a pedicle screw switchable between a monoaxial mode and a polyaxial mode of the present invention is described in detail in these embodiments, please note that in the following description, similar elements will be designated with the same reference numerals. Furthermore, the drawings of the present invention are for schematic illustration only and are not necessarily drawn to scale, and not all details are necessarily presented in the drawings.

Figure 2A:
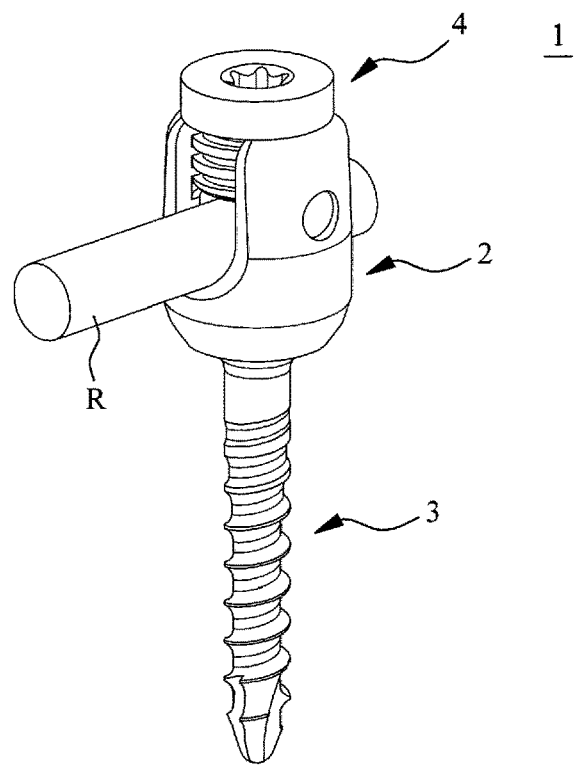
FIG. 2A is a perspective view showing the pedicle screw according the first embodiment of the present invention.
Figure 2B:
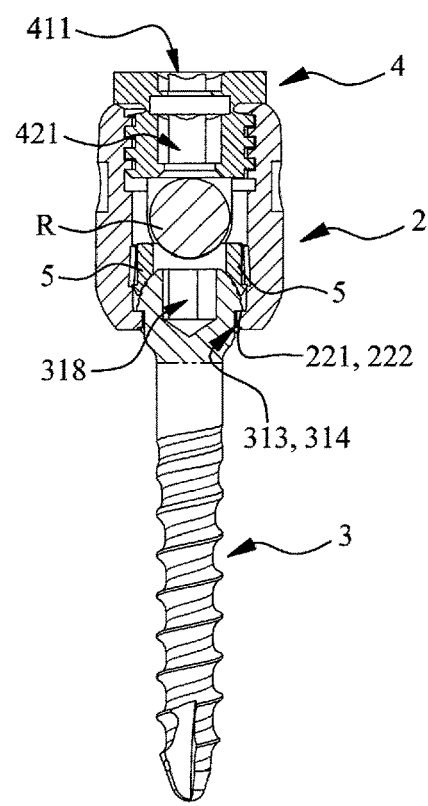
FIG. 2B is a cross-sectional view showing the pedicle screw according the first embodiment of the present invention.

Please refer to FIG. 1, FIG. 2A, and FIG. 2B first. FIG. 1 is an exploded view showing a pedicle screw according to a first embodiment of the present invention; FIG. 2A is a perspective view showing the pedicle screw according the first embodiment of the present invention; FIG. 2B is a cross-sectional view showing the pedicle screw according the first embodiment of the present invention. As shown in the figure, on the basis of assembly and connection relationship, the main members of a pedicle screw 1 switchable between a monoaxial mode and a polyaxial mode according to the first embodiment of the present invention include a fastener 4, a grooved insert 5, a bone screw 3, and a tulip 2 in order from top to bottom.

Additionally, the bone screw 3 serves as the base component of the pedicle screw 1 and is used to lock a vertebra directly; the tulip 2 serves as the key component of the pedicle screw 1 and is used to connect the bone screw 3 and a corrective connecting rod R; the grooved insert 5 serves as the fastening reinforcing component of the pedicle screw 1 and is used to reinforce the fastening effect among the bone screw 3, the tulip 2, and the corrective connecting rod R; the fastener 4 serves as the locking member of the pedicle screw 1 and is used to lock the corrective connecting rod R, applied with an external force.

Figure 3:
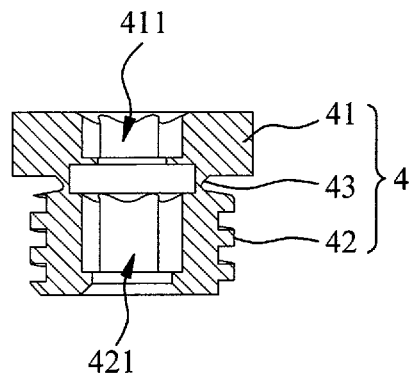
FIG. 3 is a cross-sectional view showing a fastener of the pedicle screw according to the first embodiment of the present invention.
Figure 4:
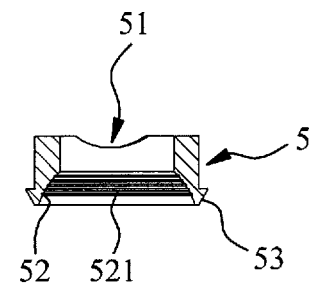
FIG. 4 is a cross-sectional view showing a grooved insert of the pedicle screw according to the first embodiment of the present invention.
Figure 5A:
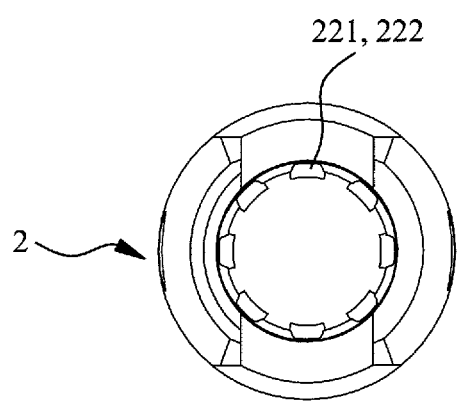
FIG. 5A is a top view showing a tulip of the pedicle screw according to the first embodiment of the present invention.
Figure 5B:
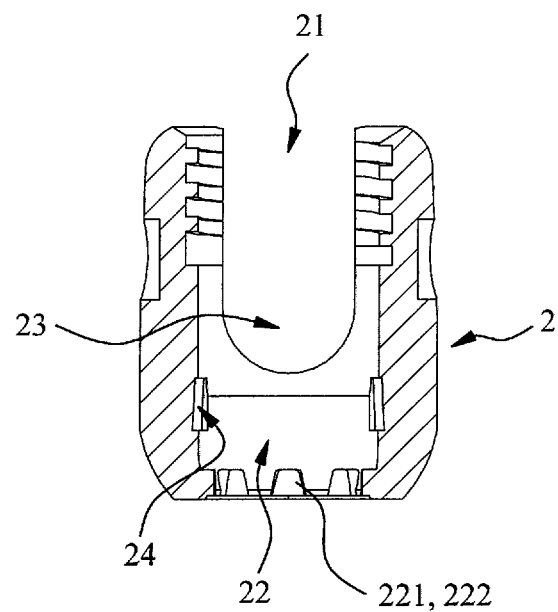
FIG. 5B is a cross-sectional view showing the tulip of the pedicle screw according to the first embodiment of the present invention.

Please refer to FIG. 3, FIG. 4, FIG. 5A, and FIG. 5B at the same time. FIG. 3 is a cross-sectional view showing the fastener of the pedicle screw according to the first embodiment of the present invention; FIG. 4 is a cross-sectional view showing the grooved insert of the pedicle screw according to the first embodiment of the present invention; FIG. 5A is a top view showing the tulip of the pedicle screw according to the first embodiment of the present invention; FIG. 5B is a cross-sectional view showing the tulip of the pedicle screw according to the first embodiment of the present invention. The detailed structure of each component and their connection relationship will be described as follows.

As shown in FIGS. 5A and 5B, the tulip 2 includes an upper opening 21, a lower opening 22, and two side openings 23. The upper opening 21 communicates with the lower opening 22, and the two side openings 23 are arranged on two sides of the tulip 2 and opposite to each other and communicate with the upper opening 21. Since the upper opening 21 communicates with the lower opening 22, the two side openings 23 also communicate with the lower opening 22. The two side openings 23 allow the corrective connecting rod R to pass through. Accordingly, the single corrective connecting rod R can pass through the tulips 2 of a plurality of pedicle screws 1 at the same time, thereby forming a three-dimensional locking structure for vertebras. Furthermore, the lower opening 22 of the tulip 2 includes a first coupling portion 221.

As shown in FIG. 1, FIG. 2A, and FIG. 2B, the bone screw 3 includes a head end 31 and a bone-locking section 32. The head end 31 includes a hemispherical top 311 and a second coupling portion 312. The second coupling portion 312 is located between the hemispherical top 311 and the bone-locking section 32. In particular, the bone screw 3 passes through the tulip 2 so that the bone-locking section 32 of the bone screw 3 is exposed outside the lower opening 22 of the tulip 2, and the head end 31 of the bone screw 3 remains inside the lower opening 22 of the tulip 2. Thereby, the tulip 2 can be deflected in multiple axial directions with respect to the bone screw 3 to facilitate the assembly of the corrective connecting rod R to the tulip 2. It is called a polyaxial mode.

As shown in FIG. 3 and FIG. 2B, specifically, the fastener 4 is tightly screwed to the upper opening 21 of the tulip 2 with an external force applied from top to bottom in order to lock the corrective connecting rod R. When the corrective connecting rod R is locked by the fastener 4 and the second coupling portion 312 of the bone screw 3 is coupled to the first coupling portion 221 of the lower opening 22 of the tulip 2, the tulip 2 will be further forcedly fastened to the bone screw 3 and cannot be deflected. At this time, the pedicle screw is switched to the monoaxial mode. It can be seen from this that switching between the monoaxial mode and the polyaxial mode can be achieved by applying an external force to the fastener 4. The key is that the second coupling portion 312 is coupled to or decoupled from the first coupling portion 221.

Moreover, the fastener 4 includes a screw-driving head 41, a threaded section 42, and a breaking portion 43. The breaking portion 43 is located between the screw-driving head 41 and the threaded section 42, wherein the breaking portion 43 is intendedly formed thinner so that the breaking portion is easier to break, causing the screw-driving head 41 and the threaded section 42 to separate from each other easier when a specific torque is applied. The specific torque is between 1 and 3 Newton-meters (Nm).

However, the stage before applying the specific torque to cause the breaking portion 43 to break can be called as a pre-locking stage. Since the torque is not strong at this stage, the corrective connecting rod R can still be bent, deflected or otherwise adjusted for correcting or stabilizing the spine. In other words, the design of the breaking portion 43 in this embodiment can ensure the torque applied by the surgeon during the pre-locking stage of surgery will not be too large all at once and therefore, will not make the corrective connecting rod R unable to be adjusted. After the corrective connecting rod R is adjusted, a second screw-driving hole 421 can be further used to perform a monoaxial locking stage.

Furthermore, the screw-driving head 41 includes a first screw-driving hole 411, and the threaded section 42 includes a second screw-driving hole 421. The first screw-driving hole 411 and the second screw-driving hole 421 communicates with each other and have different shapes for identifying the monoaxial mode and the polyaxial mode. Among them, the first screw-driving hole 411 is a hexagonal screw-driving hole, which is used for the pre-locking stage in the polyaxial mode; and the second screw-driving hole 421 is a star-screw-driving hole, which is used for the locking stage in the monoaxial mode.

As shown in FIG. 1, FIG. 2A, FIG. 2B, and FIG. 4, the grooved insert 5 is accommodated in the tulip 2 and is located between the corrective connecting rod R and the bone screw 3. The grooved insert 5 includes a U-shaped groove 51 and a concave spherical surface 52. Among them, the U-shaped groove 51 is provided at the upper end face of the grooved insert 5 to abut against the corrective connecting rod R, and the concave spherical surface 52 is provided at the lower end face of the grooved insert 5 to abut against the hemispherical top 311 of the head end 31 of the bone screw 3.

Furthermore, the concave spherical surface 52 of the grooved insert 5 is provided with a plurality of radial grooves 521, and the hemispherical top 311 of the head end 31 of the bone screw 3 is provided with a plurality of radial protrusions 317 and a screw-driving hole 318. The screw-driving hole 318 is used together with a hand tool by the surgeon at the initial stage of the surgery to screw the bone screw 3 into the pedicle. On the other hand, when the corrective connecting rod R is locked by the fastener 4, that is, when the pedicle screw is switched to the monoaxial mode, the plurality of radial protrusions 317 are engaged with the plurality of radial grooves 521, thereby improving the fixing force between the grooved insert 5 and the bone screw 3.

Moreover, positioning protrusions 53 are provided at two corresponding positions on the external surface of the grooved insert 5, and positioning grooves 24 are provided at two corresponding positions on the internal surface of the tulip 2. The positioning protrusions 53 of the grooved insert 5 are engaged with the positioning grooves 24 of the tulip 2. Therefore, in addition to positioning the grooved insert 5 so that the U-shaped groove 51 can be aligned with the corrective connecting rod R, the grooved insert 5 can also be prevented from unexpected rotation.

Furthermore, in the first embodiment of the present invention, the first coupling portion 221 is a plurality of protrusions 222 provided at the lower opening 22, and the second coupling portion 312 includes a hemispherical bottom 313 and at least one opening groove 314. The opening groove 314 is provided on the surface of the hemispherical bottom 313, and an opening 315 of the opening groove 314 faces the bone-locking section 32. Accordingly, when the opening groove 314 of the second coupling portion 312 is coupled to the protrusion 222 of the first coupling portion 221 through the opening 315 and the corrective connecting rod R is locked by the fastener 4, the tulip 2 and the bone screw 3 will be in a lock state, thereby effectively avoiding the polyaxial deflection of the tulip 2 relative to the bone screw 3, that is, avoiding switching back to the polyaxial mode.

Figure 6:
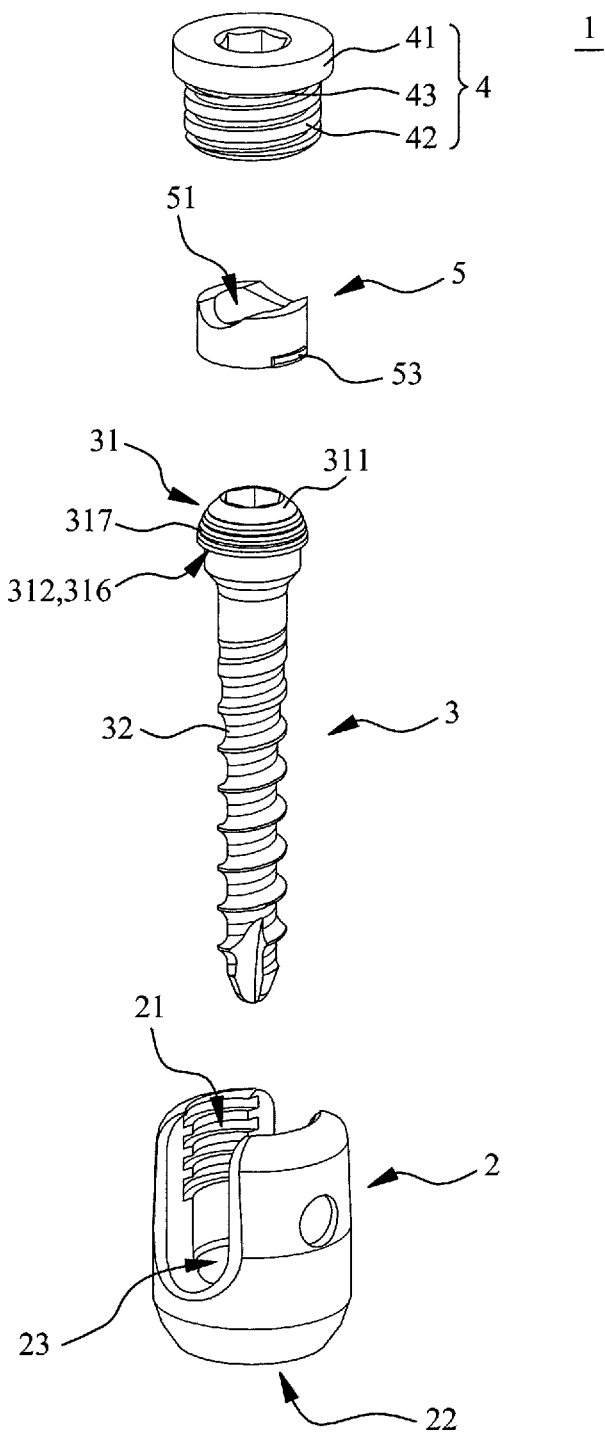
FIG. 6 is an exploded view showing a pedicle screw according to a second embodiment of the present invention.
Figure 7A:
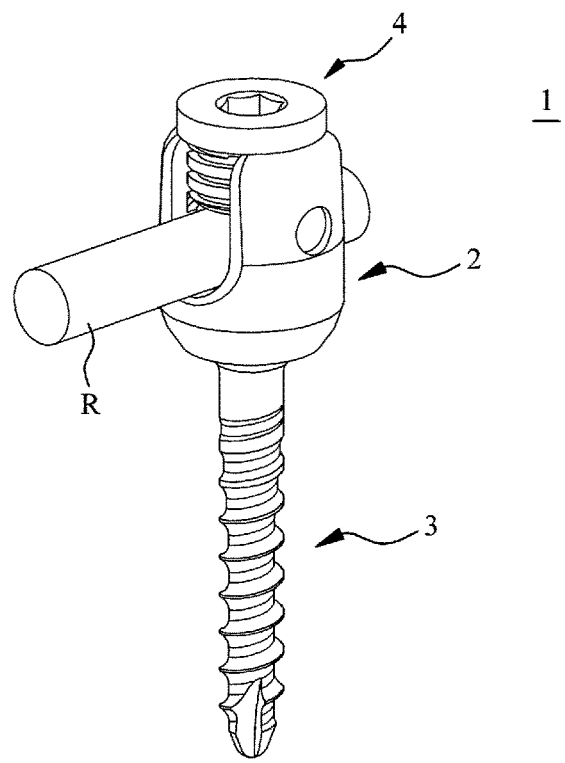
FIG. 7A is a perspective view showing the pedicle screw according the second embodiment of the present invention.
Figure 7B:
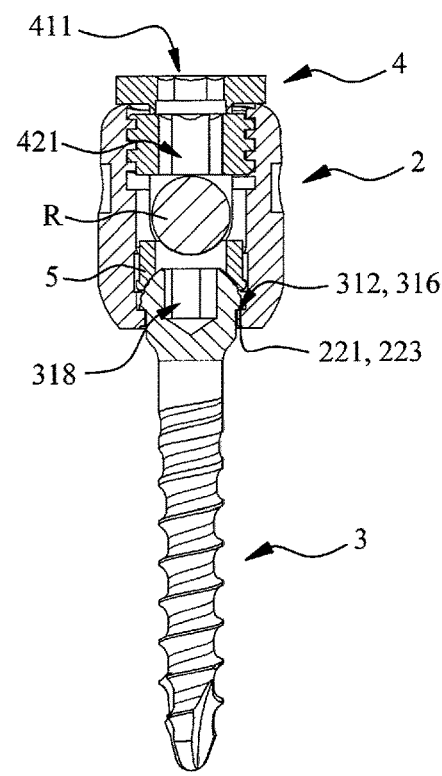
FIG. 7B is a cross-sectional view showing the pedicle screw according the second embodiment of the present invention.
Figure 8A:
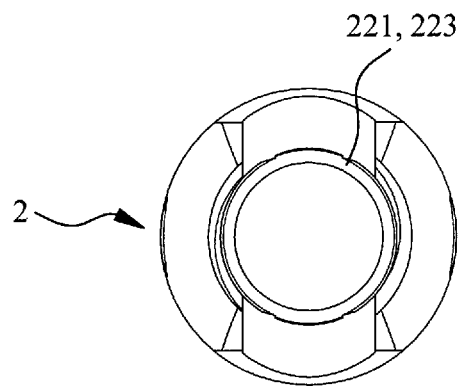
FIG. 8A is a top view showing a tulip of the pedicle screw according to the second embodiment of the present invention.
Figure 8B:
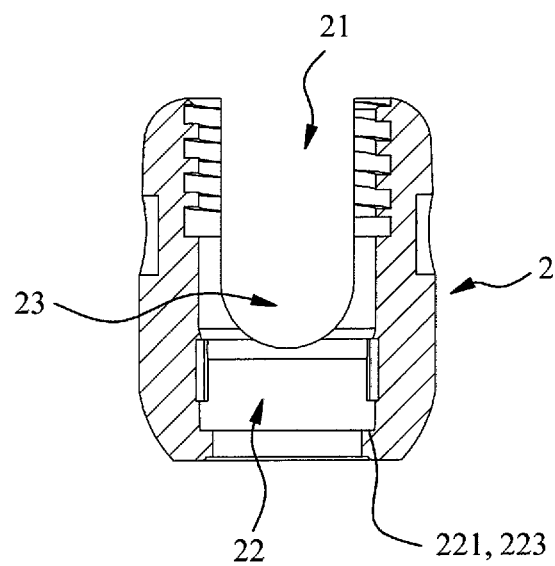
FIG. 8B is a cross-sectional view showing the tulip of the pedicle screw according to the second embodiment of the present invention.

Finally, please refer to FIG. 6, FIG. 7A, FIG. 7B, FIG. 8A, and FIG. 8B. FIG. 6 is an exploded view showing a pedicle screw according to a second embodiment of the present invention; FIG. 7A is a perspective view showing the pedicle screw according the second embodiment of the present invention; FIG. 7B is a cross-sectional view showing the pedicle screw according the second embodiment of the present invention; FIG. 8A is a top view showing a tulip of the pedicle screw according to the second embodiment of the present invention; FIG. 8B is a cross-sectional view showing the tulip of the pedicle screw according to the second embodiment of the present invention. The difference between the pedicle screw according to the second embodiment of the present invention and that according to the first embodiment mainly lies in the specific structures of the first coupling portion 221 and the second coupling portion 312 and their coupling way.

As shown in the figure, in the second embodiment of the present invention, the first coupling portion 221 includes a stop portion 223, and the second coupling portion 312 includes a step portion 316. The step portion 316 is formed at the lower end face of the hemispherical bottom 313. Accordingly, when the step portion 316 of the second coupling portion 312 is coupled to the stop portion 223 of the first coupling portion 221 and the corrective connecting rod R is locked by the fastener 4, the pedicle screw is switched from the polyaxial mode to the monoaxial mode.

The operation method of the pedicle screws in the above embodiments will be briefly described in the following. First, a plurality of bone screws 3 are screwed into the vertebras to be fixed or corrected. Subsequently, the correcting connecting rod R is inserted into each tulip 2, and the fasteners 4 (the first screw-driving holes 411) are used for pre-locking. This stage is in a polyaxial mode. Moreover, at this time, the breaking portions 43 are twisted and broken, the screw-driving heads 41 are detached from the threaded sections 42, and the second screw-driving holes 421 are exposed. Then, the spinal correction or fixation is performed by adjusting the corrective connecting rod R. Finally, the respective fasteners 4 (the second screw-driving holes 421) of the pedicle screws 1 are further screwed and tightened one by one to switch to the monoaxial mode, and at the same time, the corrective connecting rod R is locked, and therefore, the pedicle screw fixation surgery is completed.

Thereby, the pedicle screw 1 switchable between the monoaxial mode and the polyaxial mode provided by the present invention combines the advantages of the polyaxial pedicle screw that is convenient for installing the corrective connecting rod R and the monoaxial pedicle screw with an excellent axial correction effect, it can actually well stabilize slipped or translocated and deformed vertebras, and can save time and effort with an excellent correction effect on the pedicle screw fixation surgery.

The above-mentioned embodiments are only examples for the convenience of description, and the scope of the present invention should be subject to the following claims, rather than limited to the above-mentioned embodiments.

The invention claimed is:

1. A pedicle screw switchable between a monoaxial mode and a polyaxial mode, comprising:
   a tulip, including an upper opening, a lower opening, and two side openings, the upper opening communicating with the lower opening, the two side openings being arranged opposite to each other and communicating with the upper opening, the two side openings allowing a corrective connecting rod to pass through, the lower opening including a first coupling portion, wherein the first coupling portion includes at least one protrusion extending axially along the tulip;

a bone screw, including a head end and a bone-locking section, the head end including a hemispherical top and a second coupling portion, the second coupling portion being located between the hemispherical top and the bone-locking section, wherein the second coupling portion includes a hemispherical bottom and at least one opening groove extending axially along the bone screw; the at least one opening groove is provided on the surface of the hemispherical bottom; an opening of the at least one opening groove faces the bone-locking section; and a fastener screwed to the upper opening of the tulip;

wherein the bone-locking section of the bone screw passes through the lower opening of the tulip, the head end of the bone screw is located in the tulip for polyaxial movement of the tulip relative to the bone screw;

whereby tightening of the fastener to lock the corrective connecting rod urges the second coupling portion to engage the first coupling portion such that the at least one protrusion is received into the at least one opening groove, thereby constraining the tulip in a fixed monoaxial position relative to the bone screw and preventing the polyaxial movement.

2. The pedicle screw of claim 1, further comprising a grooved insert, which is accommodated in the tulip and located between the corrective connecting rod and the bone screw, the grooved insert including a U-shaped groove and a concave spherical surface, the U-shaped groove being provided at an upper end face of the grooved insert and being used to abut against the corrective connecting rod, the concave spherical surface being provided at a lower end face of the grooved insert and being used to abut against the hemispherical top of the head end of the bone screw.

3. The pedicle screw of claim 1, wherein the concave spherical surface of the grooved insert is provided with a plurality of radial grooves, and the hemispherical top of the head end of the bone screw is provided with a plurality of radial protrusions; when the corrective connecting rod is locked by the fastener, the plurality of radial protrusions are engaged with the plurality of radial grooves.

4. The pedicle screw of claim 1, wherein an external surface of the grooved insert is provided with at least one positioning protrusion; an internal surface of the tulip is provided with at least one positioning groove; the at least one positioning protrusion of the grooved insert is engaged with the at least one positioning groove of the tulip.

5. The pedicle screw of claim 1, wherein the fastener includes a screw-driving head, a threaded section, and a breaking portion; the breaking portion is located between the screw-driving head and the threaded section; when the breaking portion is subjected to a specific torque, the breaking portion breaks, causing the screw-driving head and the threaded section to separate from each other.

6. The pedicle screw of claim 5, wherein the screw-driving head includes a first screw-driving hole, and the threaded section includes a second screw-driving hole; the first screw-driving hole and the second screw-driving hole communicates with each other and have different shapes.

7. The pedicle screw of claim 5, wherein the specific torque is between 1 and 3 Newton-meters (Nm).

8. The pedicle screw of claim 1, wherein the hemispherical top of the head end of the bone screw includes a screw-driving hole.

9. A pedicle screw switchable between a monoaxial mode and a polyaxial mode, comprising:

a tulip, including an upper opening, a lower opening, and two side openings, the upper opening communicating with the lower opening, the two side openings being arranged opposite to each other and communicating with the upper opening, the two side openings allowing a corrective connecting rod to pass through, the lower opening including a first coupling portion, wherein the first coupling portion includes a stop portion extending radially inward from an inner surface of the tulip;

a bone screw, including a head end and a bone-locking section, the head end including a hemispherical top and a second coupling portion, the second coupling portion being located between the hemispherical top and the bone-locking section, wherein the second coupling portion includes a hemispherical bottom having a lower end face and a step portion; the step portion is formed at the lower end face of the hemispherical bottom, the step portion defining a surface extending in a plane substantially perpendicular to a central axis of the bone screw; and a fastener screwed to the upper opening of the tulip;

wherein the bone-locking section of the bone screw passes through the lower opening of the tulip, the head end of the bone screw is located in the tulip for polyaxial movement of the tulip relative to the bone screw;

whereby tightening of the fastener to lock the corrective connecting rod urges the second coupling portion to engage the first coupling portion such that the step portion abuts the stop portion, thereby constraining the tulip in a fixed monoaxial position relative to the bone screw and preventing the polyaxial movement.

10. The pedicle screw of claim 9, further comprising a grooved insert, which is accommodated in the tulip and located between the corrective connecting rod and the bone screw, the grooved insert including a U-shaped groove and a concave spherical surface, the U-shaped groove being provided at an upper end face of the grooved insert and being used to abut against the corrective connecting rod, the concave spherical surface being provided at a lower end face of the grooved insert and being used to abut against the hemispherical top of the head end of the bone screw.

11. The pedicle screw of claim 9, wherein the fastener includes a screw-driving head, a threaded section, and a breaking portion; the breaking portion is located between the screw-driving head and the threaded section; when the breaking portion is subjected to a specific torque, the breaking portion breaks, causing the screw-driving head and the threaded section to separate from each other.

12. The pedicle screw of claim 9, wherein the hemispherical top of the head end of the bone screw includes a screw-driving hole.

* * * * *